United States Patent
Boekholtz et al.

(10) Patent No.: US 9,920,234 B2
(45) Date of Patent: Mar. 20, 2018

(54) SEALING FLUID FOR SETTING A PACKER

(71) Applicant: Maersk Olie og Gas A/S, Copenhagen K (DK)

(72) Inventors: Edo Boekholtz, Copenhagen K (DK); Hans Van Dongen, Copenhagen K (DK)

(73) Assignee: MAERSK OLIE OG GAS A/S, Copenhagen K (DK)

( * ) Notice: Subject to any disclaimer, the term of this patent is extended or adjusted under 35 U.S.C. 154(b) by 72 days.

(21) Appl. No.: 14/372,990

(22) PCT Filed: Jan. 17, 2013

(86) PCT No.: PCT/EP2013/050779
§ 371 (c)(1),
(2) Date: Jul. 17, 2014

(87) PCT Pub. No.: WO2013/107789
PCT Pub. Date: Jul. 25, 2013

(65) Prior Publication Data
US 2015/0021028 A1  Jan. 22, 2015

(30) Foreign Application Priority Data

Jan. 18, 2012  (EP) .................... 12151493

(51) Int. Cl.
| | | |
|---|---|---|
| *E21B 33/12* | (2006.01) | |
| *C09K 8/44* | (2006.01) | |
| *E21B 33/10* | (2006.01) | |
| *E21B 33/13* | (2006.01) | |

(Continued)

(52) U.S. Cl.
CPC ............. *C09K 8/44* (2013.01); *C09K 8/508* (2013.01); *E21B 33/10* (2013.01); *E21B 33/12* (2013.01); *E21B 33/13* (2013.01); *E21B 33/134* (2013.01)

(58) Field of Classification Search
CPC ................. E21B 33/10; C09K 8/44
See application file for complete search history.

(56) References Cited

U.S. PATENT DOCUMENTS

| 3,208,525 A | 9/1965 | Caldwell et al. |
|---|---|---|
| 3,709,296 A | 1/1973 | Glenn |

(Continued)

FOREIGN PATENT DOCUMENTS

| EP | 0 898 050 A1 | 2/1999 |
|---|---|---|
| WO | WO 2005/078235 A1 | 8/2005 |

(Continued)

OTHER PUBLICATIONS

Extended European Search Report for European Application No. 12151493, completed Jun. 19, 2012.

(Continued)

*Primary Examiner* — Angela M DiTrani
*Assistant Examiner* — Andrew H Sue-Ako
(74) *Attorney, Agent, or Firm* — Brinks Gilson & Lione (57) ABSTRACT

A method and a sealing fluid for setting a packer in an annulus between a well bore and a well tubular is provided, which by adjusting i.a. the density, viscosity and setting time of the sealing fluid is able to provide among other things a full radial seal with an acceptable axial dispersion, in particular in highly deviated wells and/or in wells having eccentric annuli.

14 Claims, 5 Drawing Sheets

(51) Int. Cl.
*E21B 33/134* (2006.01)
*C09K 8/508* (2006.01)

(56) References Cited

U.S. PATENT DOCUMENTS

| | | | | |
|---|---|---|---|---|
| 3,730,273 | A * | 5/1973 | Wilson | E21B 43/14 |
| | | | | 166/269 |
| 4,275,788 | A | 6/1981 | Sweatman | |
| 4,972,906 | A * | 11/1990 | McDaniel | C09K 8/5086 |
| | | | | 166/276 |
| 5,507,345 | A * | 4/1996 | Wehunt, Jr. | E21B 33/138 |
| | | | | 166/285 |
| 5,816,748 | A | 10/1998 | Kleiser et al. | |
| 6,826,482 | B2 * | 11/2004 | Pandey | E21B 43/25 |
| | | | | 166/307 |
| 9,051,415 | B2 * | 6/2015 | Kincaid | C08G 59/066 |
| | | | | 525/523 |
| 9,222,330 | B2 * | 12/2015 | Maria Heijnen | C09K 8/50 |
| 2006/0234871 | A1 | 10/2006 | Dalrymple | |
| 2008/0264638 | A1 * | 10/2008 | Burts | C04B 40/0666 |
| | | | | 166/295 |
| 2010/0059226 | A1 * | 3/2010 | Termine | C09K 8/66 |
| | | | | 166/308.1 |
| 2010/0224365 | A1 * | 9/2010 | Abad | E21B 43/26 |
| | | | | 166/275 |
| 2011/0088916 | A1 * | 4/2011 | Heijnen | C09K 8/50 |
| | | | | 166/387 |
| 2012/0094876 | A1 * | 4/2012 | Jamison | E21B 21/00 |
| | | | | 507/100 |
| 2015/0021028 | A1 * | 1/2015 | Boekholtz | C09K 8/44 |
| | | | | 166/295 |

FOREIGN PATENT DOCUMENTS

| | | |
|---|---|---|
| WO | WO 2007/101444 A2 | 9/2007 |
| WO | WO 2009/109625 A2 | 9/2009 |
| WO | WO 2009/112530 A2 | 9/2009 |
| WO | WO 2009/121882 A1 | 10/2009 |

OTHER PUBLICATIONS

International Search Report and Written Opinion for PCT:EP2013:050779, dated May 28, 2013.

* cited by examiner

Figure 1 – Well

Figure 2 – Sealing fluid test assembly

Figure 3 – Photograph of test assembly a)

b)

c)

Figure 4 – Injection sequence

Figure 5 – Injection at multiple places

SEALING FLUID FOR SETTING A PACKER

RELATED APPLICATIONS

This application claims the benefit under 35 U.S.C. § 371 of International Patent Application No. PCT/EP2013/050779, having an international filing date of Jan. 17, 2013, which claims priority to European Application No. 12151493.9, filed Jan. 18, 2012, the contents of both of which are incorporated herein by reference in their entirety.

FIELD OF THE INVENTION

The present invention relates to a method for setting a packer in an annulus between a well bore and a well tubular. In particular, the present invention relates to a method for preparing a sealing fluid for setting a packer in an annulus containing a fluid in a well bore, as well as to a sealing fluid comprising an epoxy resin and a hardener.

BACKGROUND OF THE INVENTION

Figure 1:
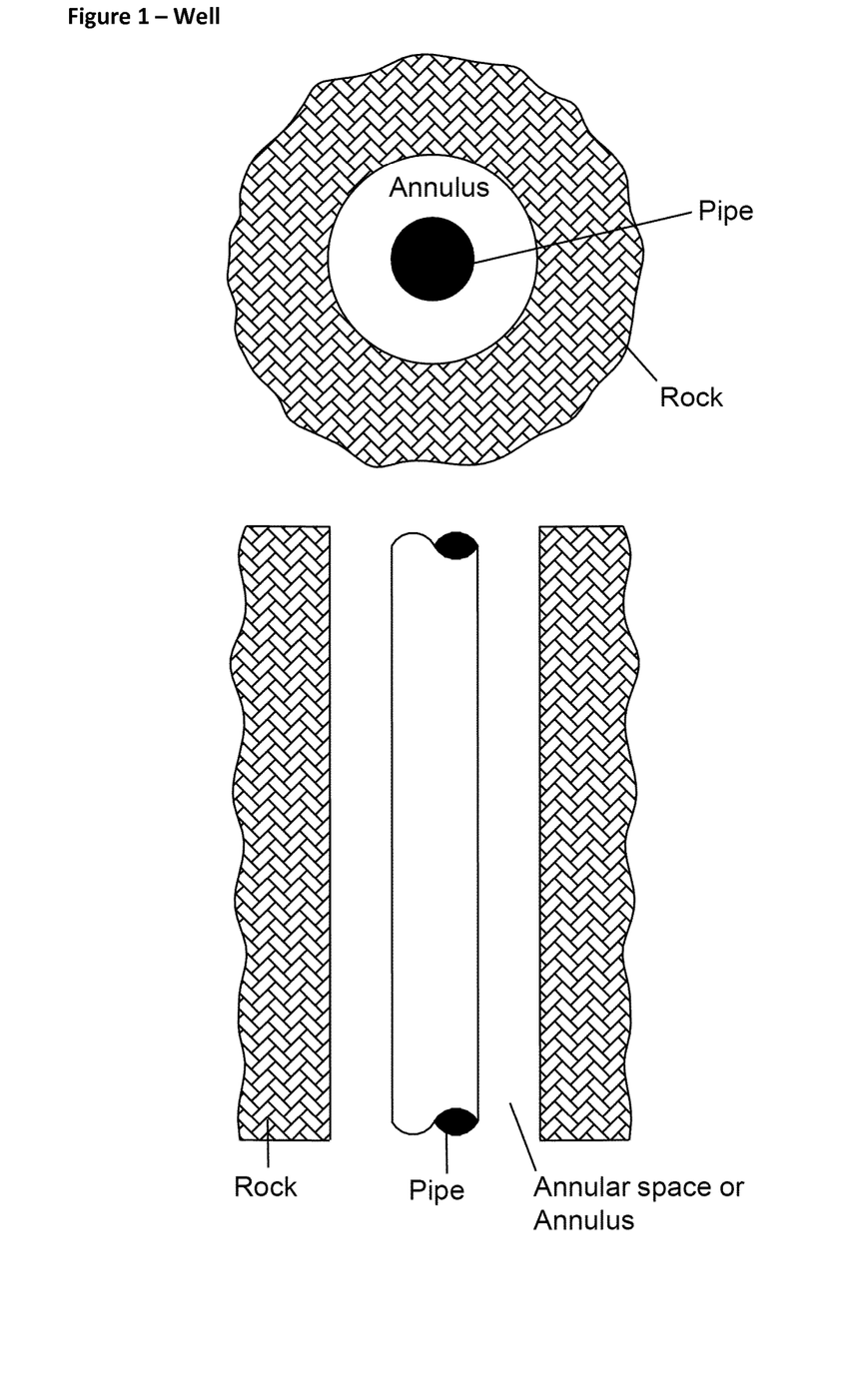
FIG. 1 gives an overview of a well tubular (pipe) inside a well bore thereby creating an annular space also called annulus.

For oil recovery a well is drilled and a well tubular may be introduced into the well bore. The outside diameter of the well tubular is smaller than the inside diameter of the wellbore, thereby forming an annular space between the well tubular and the wellbore (see FIG. 1). The well tubular is typically perforated at one or more zones in order to facilitate the flow of hydrocarbons into the tubular and subsequent flow upstream for recovery. Occasionally contaminating materials such as water and sand are produced along with the hydrocarbons from a part of the subterranean formations surrounding the well tubular. In these situations it may be desirable to seal off the well tubular from one or more parts of the annular space. This is just one example. There are also other situations, where it may be desirable to provide a sealing of the annular space.

One way of sealing off an annular space is to employ an external casing packer, which consist of a hollow rubber element, which is inflated by a fluid, e.g. concrete, which is injected by a tool. After injection, the concrete sets and keeps the rubber element in the inflated position, in which it seals between the tubing and the well bore wall. This type of packer is encumbered with the drawback that the rubber element may be damaged during the installation or inflation. Further, in an open well bore, it may also have an unsatisfactory sealing function if the geometric shape of the well's wall is enlarged beyond the outer dimension of the packer, such as in a washed out well bore.

To seal off e.g. an open (uncased) or cased wellbore, another possibility is to isolate the internal part of the well tubular using packers. Cement or another hardenable composition is then pumped down to the isolated zone to seal the perforated openings in the desired part of the well tubular.

However, materials such as cement do not have the appropriate physical properties to spread evenly into the annulus and seal off a tubular hole, in particular in deviating wells, such as horizontal wells. It is therefore required to pump large quantities of cement in order to be sure that a hole is effectively sealed or to isolate the internal part of the well tubular using temporary packers. This is both time consuming and expensive. The use of cement is also a more permanent solution since the cement will fill a large portion of the annulus between the production tubing and the casing due to excessive axial dispersion, thereby making it near to impossible to remove the production tubing if desired.

U.S. Pat. No. 4,972,906 titled "Method for selective plugging of a zone in a well" to Conoco Inc. describes the use of a mixture of a liquid epoxy material and a hardener for plugging a zone in a subterranean zone. The epoxy material used is heavier than the fluid in the well, and it is further characterized as being free of solids and having a low viscosity at downhole temperature and pressure. The material is placed in a well by the use of a positive displacement bailer. Hence, the liquid epoxy material exhibit an undesirable axial dispersion which may only partially be overcome by using an excessive amount of the epoxy material. Additionally the well should preferably remain dormant during the placement of the epoxy material and until it has hardened, and means to minimize or eliminate fluid flow, i.e. cross flow, should be employed. Thus, the method has the drawback of not facilitating a site-specific placing of the seal. Additionally the method suffers the drawback that it only works on essentially dormant wells, i.e. not experiencing a cross flow, and it does not solve the problem of setting a packer in an essentially solid free annulus, nor does it solve the problem of setting a packer in a deviating well, which is not vertical.

WO 2009/109625 A1 titled "Method for sealing an annular space in a wellbore" to Mærsk Oil and Gas A/S describes a method for providing an annular seal, which may be epoxy, phenolic or polyester based comprising at least one component and having physical and fluid dynamic properties compatible with the temperature, pressure and earth formation properties downhole. WO 2009/109625 A1 covers a great many possibilities for providing a sealing substance which is compatible with the temperature, pressure and earth formation properties downhole. However, WO 2009/109625 A1 is silent about any particular set of parameters resulting in the improved sealing fluids of the present invention.

In particular WO 2009/109625 A1 is silent about parameters that improve the sealing properties and/or reduce the axial dispersion, in particular how to solve the problem of obtaining a seal in a situation where the annulus has an active crossflow and/or how to set a packer in a deviating well.

Hence, there is a need for an improved method for setting a packer in an annulus between a well tubular and a wellbore. A need further exists for a method for setting a packer in an uncased wellbore. A need further exists for a method that reduces the axial dispersion of the sealing fluid that forms the packer in situ. A need further exists for a method for setting a packer in an annulus experiencing an active cross flow. A need further exists for a method for setting a packer in an annulus which is eccentric. A need further exists for a method for setting a packer in an annulus of a deviating well, such as a horizontal well.

SUMMARY OF THE INVENTION

The present invention was made in view of the prior art described above, and the object of the present invention is to provide a practical method for preparing a sealing fluid capable of sealing an annulus in a well bore, and an easy and reliable method for setting a packer, especially in eccentric annuli, and/or when the annulus experiences an active crossflow and/or in deviating wells.

To solve the problem, the present invention provides a method for preparing a sealing fluid for setting a packer in an annulus containing a fluid in a well bore comprising the steps of providing a hardenable composition as the sealing fluid, measuring the density and temperature of the fluid in the annulus, and adjusting the density of the sealing fluid to the density of the fluid in the annulus within ±5% @ the temperature of the fluid in the annulus; adjusting the initially mixed viscosity of the sealing fluid to above 1000 cP, such as between 1000 cP to 130000 cP @ the temperature of the fluid in the annulus, and adjusting the setting time to between 2-30 minutes @ the temperature of the fluid in the annulus.

In some embodiments of the method of the present invention, the wellbore has a deviation angle from vertical from 65° to 90° (i.e. horizontal).

That is, the present inventors found that the particular combination of density, viscosity and curing time provides for a sealing fluid, which when displaced into an annulus, provides a full radial seal with an acceptable axial dispersion, and allows the sealing fluid to be used in non-dormant wells without the need to eliminate crossflow, thereby completing the invention.

Further, the present inventors found that the sealing fluid according to the present invention could form a full radial seal with an acceptable axial dispersion when injected into an annulus of a deviated well, and at the same time the sealing fluid was able to flow through narrow gaps and thereby adapt to an eccentric annulus.

In another embodiment of the method, the sealing fluid is essentially immiscible with the fluid in the annulus.

In another embodiment of the method of the present invention, the density of the fluid in the annulus is between 0.9 g/cm$^3$ and 1.1 g/cm$^3$.

In another embodiment of the method of the present invention, the temperature of the fluid in the annulus is between 40° C. and 90° C.

In another embodiment of the method of the present invention, the hardenable composition is epoxy based.

Another aspect of the invention provides a sealing fluid comprising a hardenable or polymerizable epoxy composition comprising an epoxy resin and a hardener characterised by a density of 0.97-1.08 g/cm$^3$ @ 80° C., an initial mixed viscosity of 5000-50000 cP @ 80° C. and, a setting time of 2-30 minutes.

Another aspect of the invention provides a method for setting a packer in an annulus between a well bore, and a well tubular, comprising the steps of: providing a tool suitable for dispensing a sealing fluid; injecting a batch of the sealing fluid into the annulus through a first hole in the well tubular at a desired spot; wherein the sealing fluid has the composition as described in the methods or sealing fluids above.

In another embodiment, the method for setting a packer additionally comprises the steps of: allowing the already injected sealing fluid to set; moving the tool in the well tubular, from the previous hole, upstream of the crossflow; making an additional hole in the well tubular; injecting another batch of the sealing fluid into the annulus through the additional hole in the well tubular; wherein the additional hole in the well tubular is located between 90° and 180° from the previous hole, preferably between 120° and 180°, such as between 140° and 180°, such as between 160° and 180°.

In another embodiment, the method for setting a packer additionally comprises the steps of repeating one, two or three times the steps of moving the tool in the well tubular, from the previous hole, upstream of the crossflow; making an additional hole in the well tubular; injecting another batch of the sealing fluid into the annulus through the additional hole in the well tubular; wherein the additional hole in the well tubular is located between 90° and 180° from the previous hole, preferably between 120° and 180°, such as between 140° and 180°, such as between 160° and 180°.

In another embodiment of the method for setting a packer, the distance between two injection holes are 1-3 meters.

In another embodiment of the method for setting a packer, the annulus has an active crossflow of at least 1 bpd.

In another embodiment of the method for setting a packer, each batch of sealing fluid injected is between 5 and 30 l.

BRIEF DESCRIPTION OF THE DRAWINGS

FIG. 3a shows an injection from the top (12 o'clock) not according to the invention, where the viscosity, density and setting time has not been properly selected, resulting in an incomplete radial seal. FIG. 3b shows an injection from the top (12 o'clock) according to the invention, where the viscosity, density and setting time has been selected according to the present invention, resulting in an complete radial seal after full injection. FIG. 3c shows an injection from the side (3 o'clock) according to the invention, where the viscosity, density and setting time has been selected according to the present invention. The injection is not yet complete, at the time the photograph was taken, and corresponds approximately to the time shown in FIG. 4 (404). After complete injection (not shown) a complete radial seal was obtained.

FIG. 5 shows a schematic drawing of a displacement sequence as in FIG. 4, but with injection at multiple places.

DETAILED DESCRIPTION OF THE INVENTION

The present invention relates to a method for preparing a sealing fluid, a sealing fluid and a method for in situ forming of a seal in an annulus between a well bore and a well tubular in the well bore. It is intended to solve problems concerning the placement of seals in annuli in a subterranean well after completing and during the operating phase thereof. A need may exist for isolating one or more zones both in a production well and in an injection well, and the need may arise at any time throughout the lifetime of a well.

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

In one aspect of the present invention, a method for preparing a sealing fluid for setting a packer in an annulus containing a fluid in a well bore comprising the steps of providing a hardenable composition as the sealing fluid; measuring the density and temperature of the fluid in the annulus, and adjusting the density of the sealing fluid to the density of the fluid in the annulus within ±5% @ the temperature of the fluid in the annulus; adjusting the initially mixed viscosity of the sealing fluid to above 1000 cP, such as between 1000 cP to 130000 cP @ the temperature of the fluid in the annulus; and adjusting the setting time to between 2-30 minutes @ the temperature of the fluid in the annulus, is provided.

Figure 3:
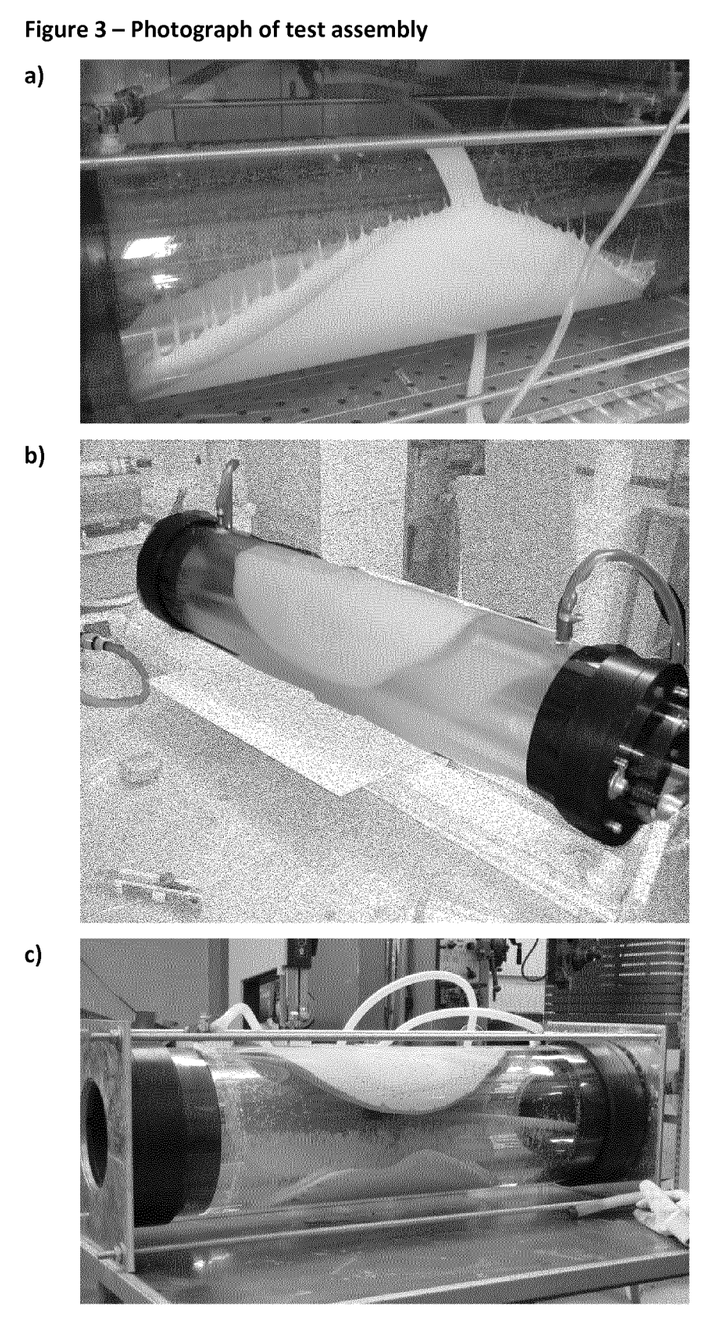
FIG. 3 shows three photographs of injections into the sealing fluid test assembly of FIG. 2.

A packer is an element used to block or divert the flow of fluids through the annular space (also called annulus) between a well tubular inside another well tubular, such as a well tubular inside a wellbore, by sealing off the space between them. As the packing element expands, it seals the annulus thereby preventing fluid flow except through the inner well tubular. A packer is being set according to the invention by injecting a sealing fluid into the annulus, see e.g. FIG. 3b or 3c, as well as FIG. 4.

In it's broadest sense, an annulus according to the present invention is used about the space created by the arrangement of a well tubular inside another well tubular. The annulus may for example be created by the arrangement of a well tubular inside a well bore, which may or may not be metal cased (i.e. where a portion of the wellbore has had a metal casing placed and cemented). When the annulus is created by the arrangement of a well tubular inside an uncased well bore (see e.g. FIG. 1), the sealing fluid according to the invention is particularly advantageous to use, as it will flow and adapt to the uneven rock surface of the wellbore. For the sake of simplicity, an annulus created by a well tubular inside another well tubular has been exemplified in this specification by reference to an annulus made from a well tubular in a well bore.

The annulus may be concentric, meaning that the well tubular shares the same centre point as the wellbore thereby making the annulus uniform. The annulus may also be eccentric, meaning that the well tubular does not share the same centre point as the wellbore. The maximum eccentricity experienced in a well is when the well tubular is touching the side of the well bore, which occurs, when the centre is offset (O) by the radius of the wellbore (R) minus the radius of the well tubular (r). This means that the eccentricity may be expressed in percent eccentricity (E) according to the following equation:

$$E=[O/(R-r)]*100\% \quad (1)$$

It follows from the equation above that 100% eccentricity (E=100%) is the same as the tubing touching the side of the well bore, whereas 0% eccentricity (E=0%) is the same as concentric.

The sealing fluid of the present invention is able to provide a seal in both concentric annuli, as well as in annuli of varying eccentricity, as the selection of viscosity, density and setting time allows the sealing fluid to flow through narrow gaps, while still being able to form a full radial seal.

For example, the sealing fluid of the present invention may provide seals in essentially concentric annuli, such as for example annuli having a degree of eccentricity (E) of 0-10%, for example an E of up to 5%. Seals may further be provided for in essentially eccentric annuli such as for example annuli having a degree of eccentricity (E) of at least 10%, such as for example at least 20, 30, 40, 50, 60, 70, 80%, e.g. from 30 to 90%, moderately eccentric annuli, such as for example annuli having a degree of eccentricity (E) of 10-50%, for example an E of at least 15, 25, 35, 45%, or for strongly eccentric annuli, such as for example annuli having a degree of eccentricity (E) of more than 50%, for example an E of more than 65, 75, 85, 90%, e.g. from 50 to 90%.

The annulus contains a liquid fluid with a density of at least 0.6 g/cm$^3$, and is essentially free of solid components, for instance the annuli where the packer is to be set is not gravel packed. The fluid may be for example formation fluid, fresh water, sea water, formation water or other water containing salts, with densities around 0.8 to 1.3 g/cm$^3$ at a temperature around 20-100° C., such as between 0.9 to 1.1 g/cm$^3$ or between 1.0 to 1.2 g/cm$^3$ at a temperature around 20-100° C., for example between 0.9 to 1.2 g/cm$^3$ at a temperature around 40-90° C., such as 60-90° C. If no liquid fluid is present in the annulus, it may be introduced to fill up the annulus with a liquid fluid before the sealing fluid is introduced.

A sealing fluid is used in the present invention as a fluid, which can provide a seal. The sealing fluid is comprises a hardenable composition, with optional additives to modify the physical parameters of the hardenable composition, where such physical parameters are selected from, but not limited to: density, viscosity and setting time of the sealing fluid.

Many types of hardenable compositions exist, which can be used in a sealing fluid. Hardenable compositions usually comprise monomer and/or oligomer units, which may be polymerized through the use of a hardener and/or a catalyst for the polymerization. Epoxies, phenolic polymers, and polyesters are all examples of hardenable compositions, which can be tailored to a broad range of properties. In some embodiments of the present invention, the hardenable composition is epoxy based, as the chemistry of epoxy systems allows them to be produced with a broad range of properties.

The sealing fluid comprising the hardenable composition undergoes several physical stages. In the first stage the initially mixed composition is a flowable liquid with a certain viscosity and density, which viscosity increases as the hardener begins to react. Eventually the sealing fluid hardens sufficiently that it ceases to flow. The point in which this occurs is called the set point. With additional time, the sealing fluid continues to react and harden until it becomes a solid.

At this point, the sealing fluid is considered to be hardened. The time required after the set point for the epoxy material to become hardened is normally of very short duration—usually from between 2 to 30 minutes. With still additional time, the sealing fluid becomes completely reacted and hardened and is considered to be cured. As with concrete, this final curing stage may take as much as several days, depending on the particular sealing fluid, i.e. the selection of the hardenable composition and the hardener.

The time to reach the setting point, the setting time, should be long enough to allow the complete dispensing of the sealing fluid into the annulus, and ideally the sealing fluid material should harden immediately after having formed a radial seal.

Delayed setting/hardening is undesirable as potential cross-flow within the treated area can cause the sealing fluid to slump or disperse into other portions of the well thereby not creating a full seal. Also, if the sealing fluid remains in an unhardened state, or if the reaction requires an extended period of time to complete, the integrity of the plug can be reduced if formation fluid continues to trickle into the wellbore before the sealing fluid has set or is hardened. By proper selection of the hardenable composition, such as for example using different hardeners and/or catalysts, setting times for the sealing fluid can be adjusted.

The sealing fluid is also essentially immiscible with the fluid in the annulus. This assures that the sealing fluid will not be diluted in any way by the fluid in the annulus so as to prevent the sealing fluid from performing its proper function.

In addition, controlling the setting time, the inventors surprisingly realised that the setting time, viscosity and density of the sealing fluid work together, and as such the setting time needs to be controlled together with both the viscosity of the sealing fluid and the density of the sealing fluid in order to obtain a sealing fluid, which sets into a complete radial seal with reduced axial dispersion, and which sealing fluid is less prone to the slumping or dispersion, than when the density, viscosity and setting time is not controlled in the same manner.

As the density, viscosity and setting time of the sealing fluid is temperature dependent, it is necessary to measure the temperature of the fluid in the annulus in the area where the packer is intended to be deployed. This temperature measurement is recorded, and the sealing fluid is adjusted to have the desired density, viscosity and setting time at the temperature of the fluid in the annulus. The typical temperature of the fluid in the annulus is between 20 to 100° C., and in some areas between 40 and 90° C., such as between 60 and 85° C. or between 60 and 90° C. The methods and compositions according to the present invention are well suited for annulus fluid temperatures above 50° C.

The initial mixed viscosity of the sealing fluid (i.e. when all components have been mixed together) at the temperature of the fluid in the annulus should be at least 1000 cP, as experiments have shown that sealing fluids with viscosities below 1000 cP either sinks to the bottom without forming a seal (see example 2, ID 6), or sags and therefore not in all cases provides a radial seal (see example 2, ID 7), whereas viscosities above 1000 cP shows little sagging and results in a full radial seal (see example 2, IDs 8 and 10).

Additionally, the initially mixed viscosity of the sealing fluid at the temperature of the fluid in the annulus should preferably not be more than 130000 cP, as above this viscosity it becomes difficult for the sealing fluid to flow through narrow gaps of eccentric annuli, and/or it further becomes difficult to dispense the entire volume of sealing fluid into the annulus in time before the sealing fluid sets.

Accordingly, the present invention provides a sealing fluid with an initially mixed viscosity above 1000 cP, for example above 10000 cP, above 20000 cP or even above 100000 cP. Preferably the initially mixed viscosity is between 1000 and 130000 cP, for example where the viscosity is lower than, 120000, such as for example lower than 110000, 100000, 90000, 80000, 70000, 60000 cP, preferably between 1000 and 50000 cP, such as between 1000 and 35000 cP, for example between 2000 and 20000 cP or between 4000 and 25000 cP. A viscosity below 25000 cP is preferred for i.a. eccentric annuli. Examples of viscosity modifying additives are clays or silicas (see e.g. materials and methods section).

In addition to the initial mixed viscosity, also the setting time of the sealing fluid should be controlled to allow the seal to set or harden as quickly as possible after having formed a radial seal, in order to avoid slumping or dispersion or otherwise impairing the integrity of the radial seal, as explained above.

Preferably the setting time of the sealing fluid after being initially mixed is between 2 and 30 minutes, preferably between 6 and 21 minutes, such as for example between 10 and 18 minutes or between 14 and 24 minutes, as such setting times allows the sealing fluid to be dispensed in a manner, which forms a radial seal. If the setting time is longer than 30 minutes, the axial dispersion of the seal would become unacceptable at the viscosity and density of the invention thereby compromising the integrity of the seal. Setting times of less than two minutes will either not leave enough time for the sealing fluid to be dispensed through a single injection hole, or require a faster injection, which will cause increased axial dispersion thereby compromising the integrity of the seal, in that it is likely that the axial dispersion caused by faster injection will not allow a radial seal to be formed, or will require excessive amounts of sealing fluid to obtain a radial seal.

In addition to both controlling the initial mixed viscosity and the setting time, it is important to control the density of the sealing fluid as it is linked to the viscosity and setting time, when a sealing fluid is desired, which sets into a complete radial seal with reduced axial dispersion, and which sealing fluid is less prone to the slumping or dispersion.

The density should ideally be identical to the fluid in the annulus, as this will eliminate the influence of gravity on the sealing fluid and the fluid in the annulus by making the sealing fluid essentially neutrally bouyant. A sealing fluid with a higher density than the fluid in the annulus will influence the sealing fluid in that it would sink, whereas a lower density sealing fluid would float in a higher density fluid in the annulus, thus creating an unacceptable axial dispersion and/or not creating a radial seal. This is especially important in cases, where a seal is desired in the annulus of a wellbore that is not vertical, the so called deviating wells, where the detrimental effect of a sealing fluid with a high or low density compared to the fluid in the annulus would be even more pronounced.

It is also particularly important to control the density when the sealing fluid has an initially mixed viscosity between 1000 and 130000 cP, to avoid the sinking or floating effect.

Therefore it is necessary to measure the density of the fluid in the annulus at the temperature of the fluid in the annulus in the area where the packer is intended to be deployed. This density measurement is recorded, and the sealing fluid is adjusted to have the desired density. The density should be controlled within a few percent of the fluid in the annulus, preferably within ±5% such as ±3% or ±2%. The density of the sealing fluid may be adjusted in several ways, such as altering the composition of the hardenable composition, or by adding a material with a lower or higher density than the desired density, which is the density of the fluid in the annulus. Examples of density modifying additives are glass bubbles (see e.g. materials and methods section) or light weight polymers.

In one embodiment of the method, the wellbore is a deviating wellbore, which has a deviation angle from vertical. A horizontal well will have a deviating angle of 90° C. from vertical. Selecting the viscosity, density and setting time as described above will allow the sealing fluid to make a radial seal with little axial dispersion, see e.g. example 2, ID 8, where an injection of the sealing fluid in a horizontal well is made from the top (12 o'clock) results in a radial seal, and example 2, ID 10, where an injection of the sealing fluid in a horizontal well is made from the side (3 o'clock), and results in a radial seal with little axial dispersion.

Accordingly, the sealing fluid of the present invention is able to provide a seal in both vertical wellbores, as well as in wellbores of varying deviation, as the selection of viscosity, density and setting time allows the sealing fluid to complete a radial seal.

For example, the sealing fluid of the present invention may provide seals in essentially vertical wellbores, such as for example wellbores having a degree of deviation from vertical, D, of 0°-10°, for example a D of up to 5°. Seals may further be provided for in essentially deviated wellbores such as for example wellbores having a degree of deviation (D) of at least 10°, such as for example at least 20°, 30°, 40°, 50°, 60°, 70°, 80°, e.g. from 30° to 90°, moderately deviated wellbores, such as for example wellbores having a degree of deviation (D) of 10°-50°, for example a D of at least 15°, 25°, 35°, 45°, or for strongly deviated wellbores, such as for example wellbores having a degree of deviation (D) of more than 50°, for example an E of more than 65°, 75°, 85°, e.g. from 50° to 90° or from 65° to 90°. Wells can have a degree of deviation of more the 90°, e.g. 100°, 110°, 120°, which for the purpose of the present description is considered to be the same as 80°, 70°, or 60° deviation.

The advantages of selecting the particular ranges of the particular sets of parameters is that the axial dispersion is reduced, thereby limiting the volume of sealing fluid to be dispensed in order to create a radial seal. Additionally the method for preparing the sealing fluid allows the packer to be set in eccentric annuli, as well as in annuli with rough edges, such as annuli in uncased wellbores and washed out wellbores, as well as in deviating wells.

While the particular parameters of the sealing fluid depend on the temperature and density of the fluid in the annulus, there are oil fields, such as for example the Dan, Gorm and Halfdan fields, wherein the annulus is flooded with sea water having a temperature of around 80° C., but typically in the range 50-90° C. such as from 60-80° C. In this particular situation, a sealing fluid could comprise a hardenable or polymerizable epoxy composition comprising an epoxy resin and a hardener having a density of 0.97-1.08 g/cm$^3$ @ 80° C.; an initial mixed viscosity of 5000-50000 cP @ 80° C. and a setting time of 2-30 minutes, such as between 10-30 minutes, e.g. between 10-20 minutes.

Figure 4:
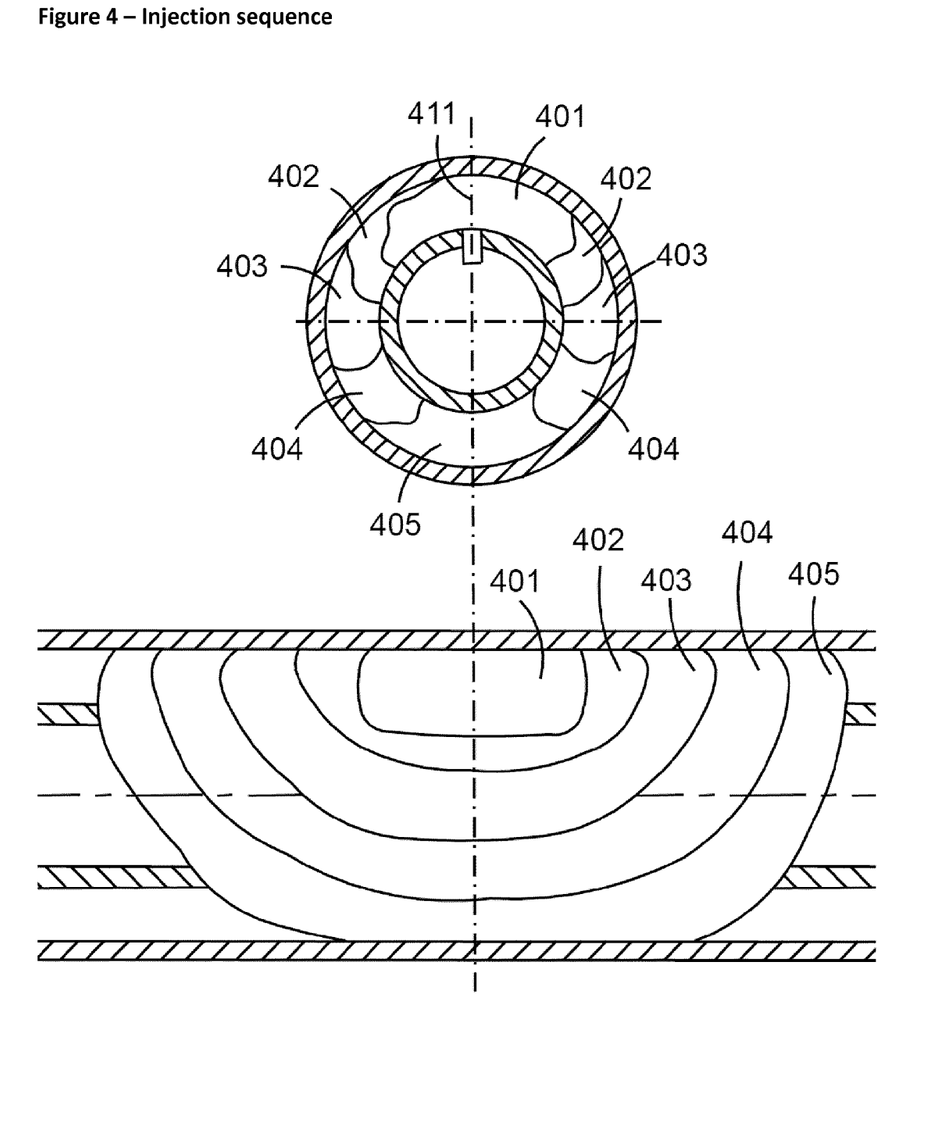
FIG. 4 shows a schematic drawing of an injection sequence of the sealing fluids when displaced into the annular space. The sealing fluid is injected through the entering hole (411), and begins to fill the annular space (401), as more sealing fluid is injected, the sealing fluid wraps radially around the inner tube thereby gradually filling (401, 402, 403, 404, 405) the annular space and resulting in a radial seal (405).

According to the present invention, also a method for setting a packer in an annulus between a well bore, and a well tubular, is provided. It comprises providing a tool suitable for dispensing a sealing fluid, and injecting a batch of the sealing fluid into the annulus through a first hole (411) in the well tubular at a desired spot, wherein the sealing fluid has the composition as described the present specification.

A tool suitable for dispensing should preferably have three characteristics, 1) a perforation function; 2) downhole mixing function; and 3) being able to inject the sealing fluid into the annulus through the injection hole.

A perforation function should be able to make the injection hole through the pipe wall of the well tubular may consist of a drilling device, a punching implement, a perforation tool, an abrasive jet or similar. For example, the perforation tool may be a perforation gun containing a shaped explosive charge for making the hole in the pipe wall. The tool should be able to hold enough of the sealing fluid, and allow for the sealing fluid to be mixed inside the body of the tool just before being injected into the hole.

Such tools are known in the art, such as a section sealing tool (e.g. as described in PCT appl. published as WO 2009/121882 A1), which is a downhole intervention tool to be deployed on wireline/tractor which will create a hole through the wall of a well tubular and inject a two-component sealing fluid into the annulus, or a sleeve sealing tool (e.g. as described in PCT appl. published as WO 2009/112530 A2), which is a downhole intervention tool to be deployed on wireline/tractor which consists of two rubber elements which can be modified with a perforation function to make a hole through the wall of a well tubular and inject a two-component sealant.

The injection or dispensing of the sealing fluid is called injecting a batch, and the size of the batch necessary to seal the annulus depends on the size of the annulus. Annuli of the dimensions as shown in the test rig of FIG. 2, and described in the materials and methods section somewhere between 5 and 30 liter sealing fluid is required, such as between 10 and 20 l.

As previously mentioned, the sealing fluid of the present invention may—due to the selection of density, viscosity and setting time—advantageously be used in a method for setting a packer in an annulus, wherein the annulus has an active crossflow. For instance an active crossflow of at least 1 barrels-per-day (bpd), preferably more than 5 bpd e.g. from 1-20 bpd or from 5-20 bpd or from 5-10 bpd. Obviously, the sealing fluid of the present invention may also be used in a method for setting a packer in an annulus, which does not experience an active crossflow.

Figures 5A, 5B, 5C:
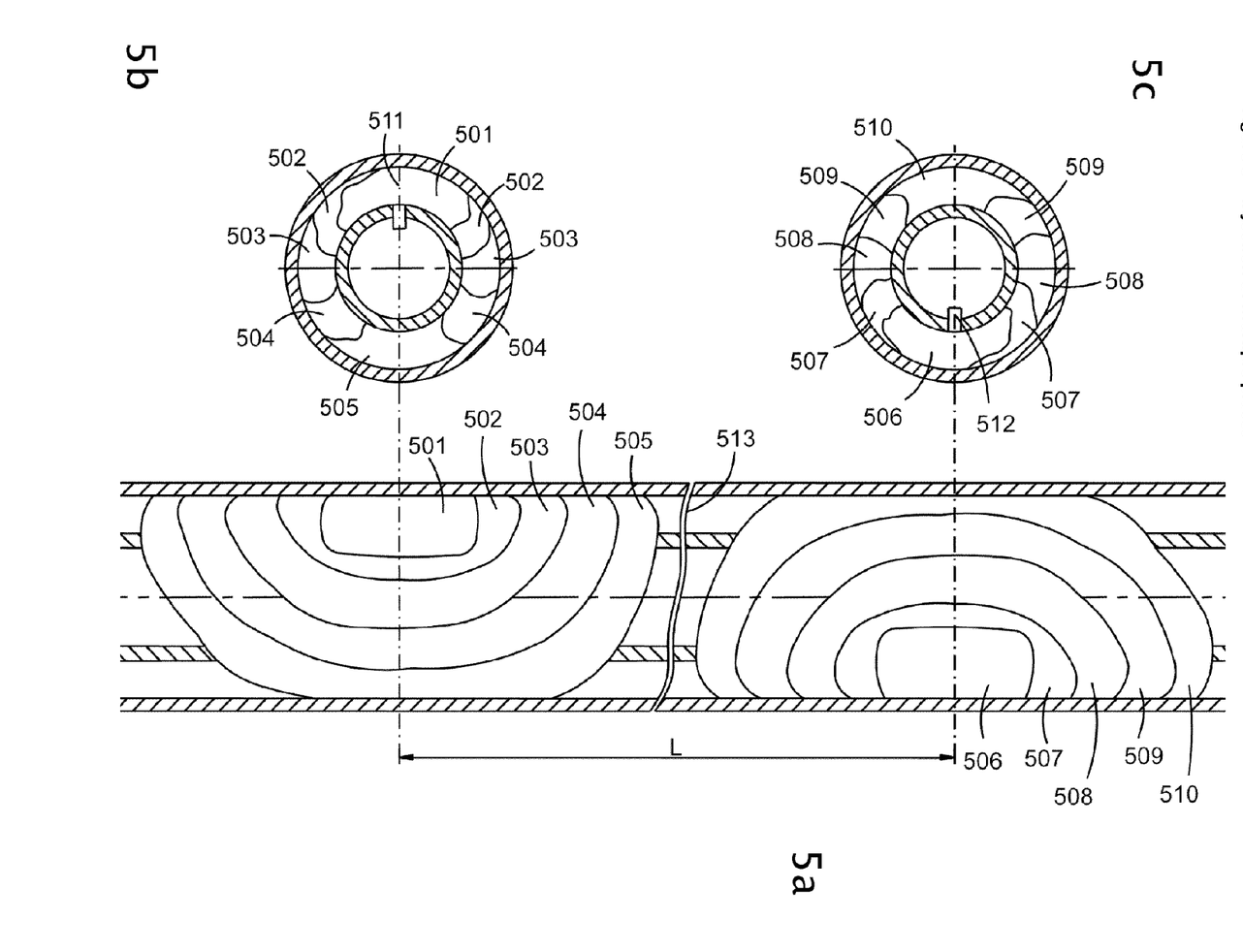
FIG. 5a shows the inner tube inside the outer tube with two entering holes (511 and 512), which only can be seen on the cross sections FIGS. 5b and 5c. The broken line (513) between the two entering holes illustrates that the length (L) between the entering holes (511 and 512) can be shorter or longer than actually shown on the figure, and the sealing fluids may further be in physical contact, such as e.g. 509 or 510 being in physical contact with e.g. 504 or 505.

If the sealing fluid provides an incomplete seal for some reason, e.g. if the active crossflow is too large, resulting in an incomplete seal (e.g. where the sealing fluid only fills 501, 502, 503, 504), where a full radial seal is not obtained, it is possible to inject one or more additional batches of sealing fluid by allowing the previously injected sealing fluid (e.g. 501, 502, 503, 504) to set, then move the tool in the well tubular, from the previous hole (511), upstream of the crossflow, make an additional hole (512) in the well tubular, and inject another batch (506, 507, 508, 509, 510) of the sealing fluid into the annulus through the additional hole (512) in the well tubular. In case hydraulic communication is still present via the sealant injection hole(s), the treatment can be repeated in the same position.

In certain embodiments the additional hole in the well tubular is advantageously located between 90° and 180° from the previous hole, preferably between 120° and 180°, such as between 140° and 180°, such as essentially diametrically, i.e. between 160° and 180°. In FIG. 5, the additional hole (512) is shown 180° from the previous hole (511). When the next injection is done upstream of the crossflow through a hole essentially diametrically to the previous injection hole, it has the advantage that the crossflow will axially disperse the sealing fluid, and attempt to force it through the unsealed part of the previous hole, in other words the crossflow will tend to push the sealing fluid in the remaining channel in the previous plug. However, the setting time of the sealing fluid will eventually set the sealing fluid in such a way that the annulus is sealed, i.e. the sealing fluid will set while the crossflow pushes the sealing fluid through the remaining channel in the previous plug.

In certain embodiments, up to three additional holes may be made and a sealing fluid be injected, as described in the above paragraph, such as one, two or three additional holes.

The distance (FIG. 5, L) between each additional hole may be 0 meters. It may depend on the magnitude of the crossflow, and should be between 0.5 to 3 meters from the previous hole, such as 1-3 meters, or 1, 1.5, 2, 2.5 meters from the previous hole. The tool used for injecting the sealing fluid may be modified in such a way that it has two injection ports placed essentially diametrically from each other, and further have a valve system allowing the dispensing of sealing fluid through both injection ports at the same time or each one at a time. A tool with two injection ports as described above has the advantage that an essentially diametrical injection hole can be easily made without the need for rotating the tool in the well tubular and without using other means to geometrically determine where the hole should be located, when the additional sealing fluid should be injected between 90° and 180° from the previous hole, such as preferably between 120° and 180°, such as between 140° and 180°, such as essentially diametrically, i.e. between 160° and 180°.

Each additional batch of sealing fluid may be the same as the first batch injected, or it may be more or less, depending on the circumstances. For example if the previous injection sealed portions of the annulus corresponding to 501, 502, 503, 504, then an additional batch could be injected diametrically opposite to the previous hole (511) and slightly upstream such that the injection of the second batch through 512 will be in physical contact with the set sealing fluid 504, already when as little as the amount shown in 506 or 507 has been dispensed. In certain embodiments each additional batch of sealing fluid injected is between 5 and 30 l, such as between 10 and 20 l.

EXAMPLES

Materials and Methods

Sealing Fluid Test Assembly

The following example shows how a test rig may be set up in order to model the conditions downhole, and to test the ability of different compositions of the sealing fluid to enter and spread out equally in both axial and radial direction in a wellbore and create a uniform seal.

A transparent test assembly was made (FIG. 2) to show and observe the material behaviour when entering the annular space in a closed double tubular cross section—similar to that of an existing oil well.

Figure 2:
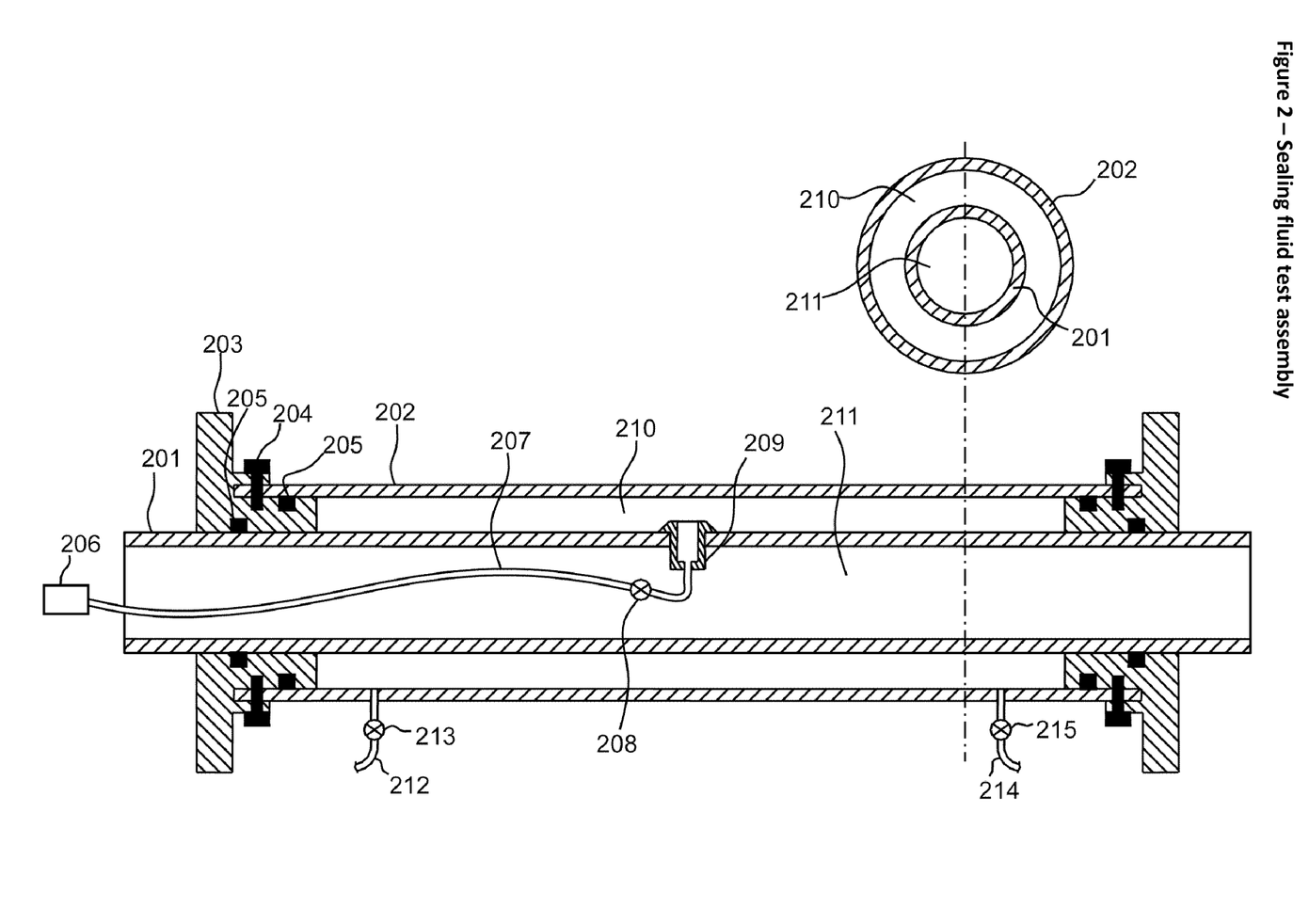
FIG. 2 shows a schematic drawing of a sealing fluid test assembly with a transparent inner tube (201) inside a transparent outer tube (202) creating an annulus (210), where a sealing fluid can be injected through an entering hole (209) and the ability to form a full radial seal in the annulus, as well as axial dispersion can be determined.

The test assembly comprise two transparent Poly(methyl methacrylate) (PMMA) tubes, an inner tube (201) with outer diameter φ150 mm and an outer tube (202) with inner diameter 0220 mm. The length of the tubes are 1 m. An entering hole (209) with a small entering valve (208) was placed at the centre of the inner tube—simulating an actual entering hole in an existing oil well. The entering valve was connected to a gear pump (206) with a flexible transparent ½" PVC tube (207). Polymer for injection was kept in a simple tank connected to the pump. Output from the gear pump was controlled by a frequency transformer. The assembly was closed in both ends with plugs (203) made of PE (polyethylene) and held in place with clamps (204). The O-ring seals (205) makes sure that no leaking occurs.

On the outer tube (202) were placed two small connecting pieces (212 and 214) for ventilation of air via valves (213 and 215) when preparing the assembly and letting out salt water during filling tests. The test assembly was filled with salt water before testing and the test was carried out at normal atmospheric pressure (1 bar) and at ambient temperature (20-25° C.) as well as elevated temperatures (around 75-80° C.).

An eccentric version of the test assembly was also made to simulate the polymer's ability to spread out and close the gap between steel pipe and rock equally in both axial and radial direction, even when the cavity has an eccentric cross section with only a small gap at one side and a large gap on the opposite side.

Viscosity Measurements

Viscosity measurements were done using a Brookfield CAP 2000+ viscosity meter using cone plate geometry with integrated temperature control, equipped with a type 09 cone and using a rotational speed of 50 rpm.

The measurement was done by placing a small amount of sample material on the central plate of the Viscosimeter—this central plate was temperature controlled. After temperature equilibration the measurement was initiated by lowering the rotating cone above down into the sample material. The rotation speed can be programmed up front. The equipment can be programmed to do a stepwise increase in temperature and/or speed thus creating a graph showing viscosity versus temperature graph for the temperature range: 5-75° C.

Epoxy

The epoxy used was Ampreg 22 epoxy resin (Gurit Ltd., United Kingdom). According to the materials safety data sheet (revision 5 Oct. 2007), the resin sold under the trade name Ampreg 22 epoxy resin contains a mixture of the following components (in wt %) below with harmless additions:

| | | |
|---|---|---|
| 50-100% | bisphenol-A-(epichlorhydrin) epoxy resin (number average molecular weight ≤ 700) | (CAS: 25068-38-6) |
| 2.5-10% | Diglicidylether of Bisphenol-F | (CAS: 28064-14-4) |
| 2.5-10% | C12/C14 Alkylglycidylether | (CAS: 68609-97-2) |
| 0.5-2.5% | 1,2,3-trimethylolpropanetriglycidylether | (CAS: 30499-70-8) |

50-100% bisphenol-A-(epichlorhydrin) epoxy resin (CAS: 25068-38-6) (number average molecular weight 700)

2.5-10% Diglicidylether of Bisphenol-F (CAS: 28064-14-4)

2.5-10% C12/C14 Alkylglycidylether (CAS: 68609-97-2)

0.5-2.5% 1,2,3-trimethylolpropanetriglycidylether (CAS: 30499-70-8)

The viscosity is 3915 cP @20° C. and the density is 1.150 g/cm$^3$

Epoxy Hardener

The hardener used was Ampreg 22 Fast hardener (Gurit Ltd., United Kingdom) in resin-hardener ratio 100:28 (by weight). According to the materials safety data sheet (revision 17 Jun. 2010), the resin sold under the trade name Ampreg 22 Fast hardener contains a mixture of the following components (in wt %) below with harmless additions:

| | | |
|---|---|---|
| 25-50% | Formaldehyde Polymer with Phenol and TETA | (CAS: 32610-77-8) |
| 25-50% | 2-piperazin-1-ylethylamine | (CAS: 140-31-8) |
| 10-25% | Benzyl alcohol | (CAS: 100-51-6) |
| 2.5-10% | Phenol | (CAS: 108-95-2) |
| 2.5-10% | 3,6-diazaoctanethylenediamine | (CAS: 112-24-3) |
| 2.5-10% | 3,6-dioxaoctamethylenediamine | (CAS: 929-59-9) |
| 2.5-10% | 3-aminomethyl-3,5,5-trimethyl-cyclohexylamine | (CAS: 2855-13-2) |
| 2.5-10% | Polyoxyalkyleneamine | (CAS: 9046-10-0) |
| 0.5-2.5% | 4-tert-butylphenol | (CAS: 98-54-4) |

Phenolic Polymer

The phenolic polymer used was Cellobond® J2027L (Momentive Specialty Chemicals Inc., USA), which is a low viscosity unmodified liquid phenolic resole resin.

Unsaturated Polyester

The unsaturated polyester used was Viapal® UP 495/48 (Cytec Industries, Inc., USA), which is a bisphenol A/fumaric acid resin with high deformation resistance in heat.

Silica Additive (Viscosity Modifying Additive)

Silica flakes was used to increase viscosity of the sealing fluid. The silica used was hydrophilic fumed silica with a specific surface area of 200 m$^2$/g, and density of 2.2 g/ml (Aerosil® 200 from Degussa).

Nanoclay Additive (Viscosity Modifying Additive)

Nanoclay was used to increase viscosity of the sealing fluid. The nanoclay used was derived from a naturally occurring montmorillonite especially purified and modified with a quaternary ammonium salt, dimethyl benzylhydrogenated tallow ammonium (Dellite® 43B from Laviosa Chimica Mineraria SpA, Italy).

Glass Bubbles Additive (Density Modifying Additive)

Glass bubbles were used to adjust density of the sealing fluid. The glass bubbles are high-strength polymer additives made from a water-resistant and chemically-stable soda-limeborosilicate glass. The glass bubbles used had an average size of 30 microns, a density of 0.6 g/cm$^3$ and a crush strength of 10000 psi (690 bar) (3M™ Glass bubbles S60)

Example 1

Testing Different Polymer Types at Ambient Temperature

Three different types of polymers (Epoxy, Phenolic polymer, unsaturated polyester) were tested in the sealing fluid test assembly at ambient temperature (20-25° C.) and at ambient pressure (1 bar) to demonstrate the usefulness of different types of polymers.

The pump, pipe and sealing fluid was likewise kept at ambient temperature (20-25° C.), and the pump rate of the sealing fluid was 1 l/min.

The annulus of the test assembly was filled with salt water to simulate a well bore fluid. The density of the well bore fluid was adjusted to show a near equal density to the sealing fluid. Injections of the sealing fluids were done through the entering hole (209) from the top (12 o'clock).

of epoxy was observed. ID 1 was repeated using an eccentric setup also resulting in a complete seal.

Injection of phenolic polymer with 1 wt % silica (ID 4): the little higher density of polymer compared to the water caused a higher radial expansion but still a good seal was formed, little interaction with water, complete seal.

Injection of polyester with 3 wt % silica (ID 5) showed good seal, no mixing with water, solid flow front, uniform expansion in radial and axial direction, after 24 hrs only minor movement was observed.

A hardener was added to the sealing fluid in experiment ID no. 3.

Epoxy with 3 wt % silica and fast hardener (ID 3) showed good filling of annular space in radial and axial direction, complete seal, and solid material after curing.

Based on the results obtained in example 1 it was found that a seal that would stay in place could be made with all three sealant types (ID1-5). Additionally, it was found that adding a hardener (ID3) still allowed the sealing fluid to be pumped and injected into the annulus before the sealing fluid hardens. The conclusion is that all three sealants with silica added showed good annular filling of both the concentric as well as the eccentric test setup. Due to difficulties experienced with controlling the curing parameters of the unsaturated polyester, it was not selected for further testing. The phenolic polymer was also not selected for further testing as the curing process was slow.

Example 2

Testing Polymer at Elevated Temperatures

The epoxy sealant was used for the subsequent tests in the sealing fluid test assembly, which was heated to 75-80° C. to simulate downhole conditions. The pump, pipe and sealing fluid was likewise kept at downhole temperature (75-80° C.), and the pump rate of the sealing fluid was between 0.6 and 2.2 l/min. The pressure was kept at ambient pressure (1 bar).

| ID | Sealant type | Hardener | Additive(s) | Sealing fluid viscosity (cP) | Sealing fluid density (SG) | Salt water density (SG) |
|----|--------------|----------|-------------|------------------------------|----------------------------|-------------------------|
| 1 | Epoxy | None | 2 wt % Silica | 6400 | 1.16 | 1.16 |
| 2 | Epoxy | None | 2 wt % Silica | 6400 | 1.16 | 1.15 |
| 3 | Epoxy | Fast hardener (100:28) | 3 wt % Silica | 1300-1600 @5-8 min | 1.1 | 1.1 |
| 4 | Phenolic polymer | None | 1 wt % Silica | 18240 | 1.2 | 1.2 |
| 5 | Unsaturated polyester | None | 3 wt % Silica | 9920 | 1.031 | 1.03 |

Ampreg 22 resin was used as the epoxy resin, Ampreg 22 fast hardener as the Hardener, Cellobond J2027L as the phenolic polymer, Viapal UP 495/48 as the unsaturated polyester, and Aerosil A-200 as a viscosity modifying additive.

No hardener was added to the sealing fluid in experiments ID nos. 1, 2, 4, 5.

Injection of epoxy with 2 wt % silica (ID 1 and 2) showed good filling of annular space, solid flow front, no interaction/mixing with water, complete seal. After 24 hrs no movement The annulus of the test assembly was filled with salt water to simulate a well bore fluid (also heated to 75-80° C.). The density of the well bore fluid was adjusted to the typical density of salt water present downhole to simulate downhole conditions. The density of the sealing fluid was adjusted by adding i.a. glass bubbles to be within 5% of the well bore fluid. Injections of the sealing fluids were done through the entering hole (209), and were all done from the top (12 o'clock), with the exception of ID10, where the sealing fluid was injected from the side (3 o'clock).

| ID | Sealant type | Hardener | Additive(s) | Sealing fluid viscosity (cP) | Sealing fluid density (SG) | Salt water density (SG) |
|---|---|---|---|---|---|---|
| 6 | Epoxy | None | 2 wt % Dellite 43B; 10 wt % 3M S60 | 300 | 1.036 | 1.026 |
| 7 | Epoxy | None | 8 wt % Dellite 43B; 12.6 wt % 3M S60 | 600 | 1.045 | 1.042 |
| 8 | Epoxy | None | 10 wt % Dellite 43B; 13.5 wt % 3M S60 | 4000 | 1.036 | 1.043 |
| 9 | Epoxy | None | 12 wt % Dellite 43B; 14.3 wt % 3M S60 | 30000 | N/A | N/A |
| 10 | Epoxy | None | 10 wt % Dellite 43B; 12.8 wt % 3M S60 | 4000 | 1.042 | 1.046 |

Ampreg 22 resin was used as the epoxy resin, Dellite 43B as a viscosity modifying additive and 3M S60 glass bubbles as density modifying additive.

Injection of epoxy with 2 wt % Dellite 43B (ID 6) showed that the sealing fluid sinks and fills the bottom part of tube. The pumping was halted when the material reached the end packers. 2 hours later no movement or shape change was observed. This indicates a thixotropic effect of the sealing fluid.

Injection of epoxy with 8 wt % Dellite 43B (ID 7) showed some sagging while pumping. No movement/shape change was observed after 24 hrs.

Injection of epoxy with 10 wt % Dellite 43B (ID 8) showed little sagging while pumping. No movement/shape change was observed after 24 hrs.

Injection of epoxy with 12 wt % Dellite 43B (ID 9) could not be done because of the limitations of the pump, which was unable to displace the sealing fluid due to a too high viscosity. The temperature of the sealing fluid was increased to 100° C. However, the presently used pump for the test rig was still unable to pump the sealing fluid.

Experiment ID no. 8 was repeated in experiment ID no. 10, where the sealing fluid was injected from the side (3 o'clock).

Injection of epoxy with 10 wt % Dellite 43B (ID 10) from the side (3 o'clock) showed a good distribution of sealing fluid, both radially and axially. No movement/shape change was observed after 24 hrs.

Based on the results obtained in example 3 it was found that the density of the sealing fluid could be tuned to match the wellbore fluid, and importantly that the sealing fluid could also function under downhole temperature conditions. Additionally it was shown that injection from both the top (12 o'clock) and from the side (3 o'clock) did not affect the ability of the sealing fluid to seal the annulus, see also FIG. 3c.

Finally it can be seen from the results obtained that the viscosity is important in relation to the density in that 300 cP (ID 6) is too low a viscosity for a seal to be formed even though the density is tuned within 1% of the density of the well bore fluid.

The invention claimed is:

1. A method for preparing a sealing fluid for setting a packer in an annulus experiencing an active cross flow from 1 to 20 barrels-per-day containing a fluid in form of formation fluid, fresh water, sea water or other water containing salts having a density between 0.8-1.3 g/cm$^3$ and a temperature between 20-100° C. in a well bore comprising:
   determining an exact density and temperature of the fluid contained in the annulus,
   providing a hardenable composition comprising monomer and/or oligomer units of an epoxy to be polymerized through use of a hardener and/or catalyst able to be tailored to properties, as the sealing fluid,
   determining density, viscosity and setting time of the hardenable composition,
   adding a material having a lower or a higher density than the sealing fluid and comprising glass bubbles additive or polymers, thereby adjusting the density of the sealing fluid to the density of the fluid in the annulus within ±5% at the temperature of the fluid in the annulus,
   adding a viscosity modifying additive comprising silica additive or nanoclay additive, thereby adjusting the initially mixed viscosity of the sealing fluid to between 1000 cP to 130000 cP at the temperature of the fluid in the annulus, and
   adding a hardener and/or a catalyst, thereby adjusting the setting time to between 2-30 minutes at the temperature of the fluid in the annulus,
   wherein adjusting of the density, viscosity, and setting time results in a sealing fluid that resists crossflow fluid conditions experienced within the annulus.

2. The method according to claim 1, wherein the wellbore has a deviation angle from vertical from 65° to 90°.

3. The method according to claim 1, wherein the sealing fluid is substantially immiscible with the fluid in the annulus.

4. The method according to claim 1, wherein the density of the fluid in the annulus is between 0.9 g/cm$^3$ and 1.1 g/cm$^3$.

5. The method according to claim 1, wherein the temperature of the fluid in the annulus is between 40° C. and 90° C.

6. A method for setting a packer in an annulus between a well bore and a well tubular, and wherein the annulus has an active crossflow from 1 to 20 barrels-per-day, comprising:
   a) providing a tool suitable for dispensing a sealing fluid;
   b) injecting a batch of the sealing fluid into the annulus through a first hole in the well tubular at a desired spot;
   wherein the sealing fluid is prepared according to claim 1.

7. The method according to claim 6, wherein each batch of sealing fluid injected is between 5 and 30 l (liters).

8. The method according to claim 6, further comprising:
   c) allowing the already injected sealing fluid to set;
   d) moving the tool in the well tubular, from the previous hole, upstream of the crossflow;
   e) making an additional hole in the well tubular;
   f) injecting another batch of the sealing fluid into the annulus through the additional hole in the well tubular.

9. The method according to claim 8, wherein steps c) to f) are repeated one, two or three times.

10. The method according to claim 8, wherein the distance (L) between two injection holes are 1-3 meters.

11. The method according to claim 8, wherein the additional hole in the well tubular is located between 90° and 180° from the previous hole.

12. The method according to claim 11, wherein steps c) to f) are repeated one, two or three times.

13. The method according to claim 11, wherein the distance (L) between two injection holes are 1-3 meters.

14. A method for setting a packer in an annulus between a well bore and a well tubular, and wherein the annulus has an active crossflow from 1 to 20 barrels-per-day, comprising:
   a) providing a tool suitable for dispensing a sealing fluid;
   b) injecting a batch of the sealing fluid into the annulus through a first hole in the well tubular at a desired spot; wherein the sealing fluid is prepared according to claim 2.

* * * * *